United States Patent [19]

Hicks et al.

[11] Patent Number: 5,406,449
[45] Date of Patent: Apr. 11, 1995

[54] PULLOUT TYPE ELECTRIC DISCONNECT SWITCH

[75] Inventors: Loy A. Hicks, Germantown; Richard A. Reiner, Colgate; David M. Tallman, Whitefish Bay; Kurt R. Van Wormer, Mequon, all of Wis.

[73] Assignee: Eaton Corporation, Cleveland, Ohio

[21] Appl. No.: 169,263

[22] Filed: Dec. 20, 1993

[51] Int. Cl.⁶ ............................................. H02B 1/08
[52] U.S. Cl. .................... 361/616; 200/43.05; 200/50 A; 200/304; 361/643
[58] Field of Search ................ 439/620, 621; 361/616, 361/622, 626, 641–643, 654, 657; 337/8, 9; 200/304, 239, 243, 50 A, 51 R, 43.04, 43.05, 16 A, 16 F

[56] References Cited

U.S. PATENT DOCUMENTS

| Re. 34,113 | 10/1992 | Miller et al. | 361/356 |
|---|---|---|---|
| 1,071,169 | 8/1913 | Metz | 200/43.05 |
| 2,438,094 | 3/1948 | Petrullo | 200/43.05 |
| 4,717,794 | 1/1988 | Paul | 200/50 A |
| 4,851,963 | 7/1989 | Miller | 361/356 |
| 4,870,542 | 9/1989 | Koslosky | 361/355 |
| 5,289,347 | 2/1994 | McCarthy | 361/809 |

OTHER PUBLICATIONS

Eaton Cutler–Hammer Construction Industry Catalog, Feb., 1982, (cover page & p. 15).
Eaton Cutler–Hammer Construction Industry Catalog, 1991–1992 (cover and pp. 1,19).

Primary Examiner—Gerald P. Tolin
Attorney, Agent, or Firm—L. G. Vande Zande

[57] ABSTRACT

A rigid insulating shield has tabs at a lower end inserted in slots in a case and a press-in fastener at an upper end inserted within a hole in a switch base assembly for securing said shield within the case. A handle pullout has a large flange extending over the shield when inserted in the switch base assembly to prevent removal or displacement of the shield while the handle pullout is inserted in an ON position of the switch. The flange is sufficiently large to block direct access to termination means on the switch base assembly when the shield is removed and the handle pullout is inserted in the switch ON position.

7 Claims, 3 Drawing Sheets

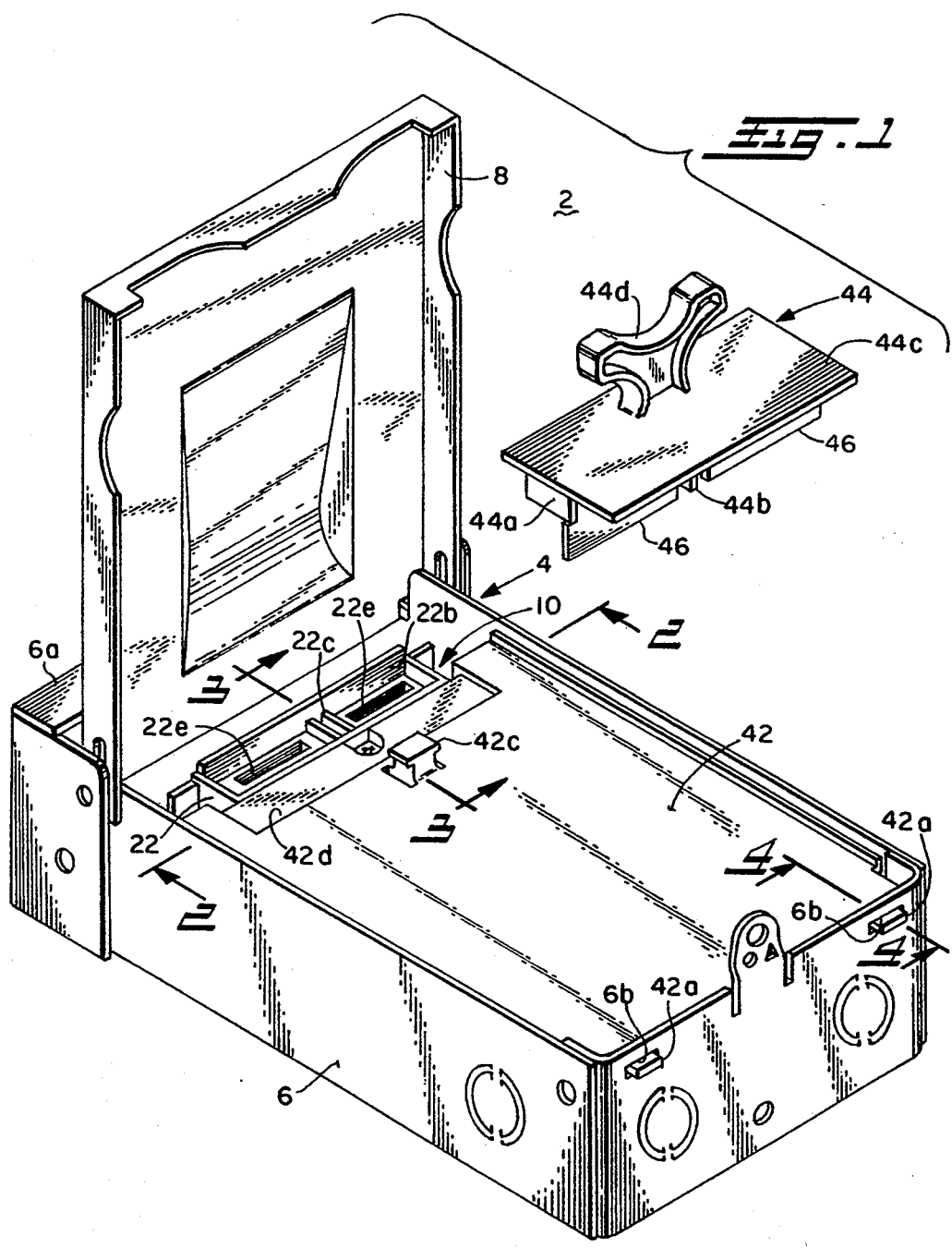

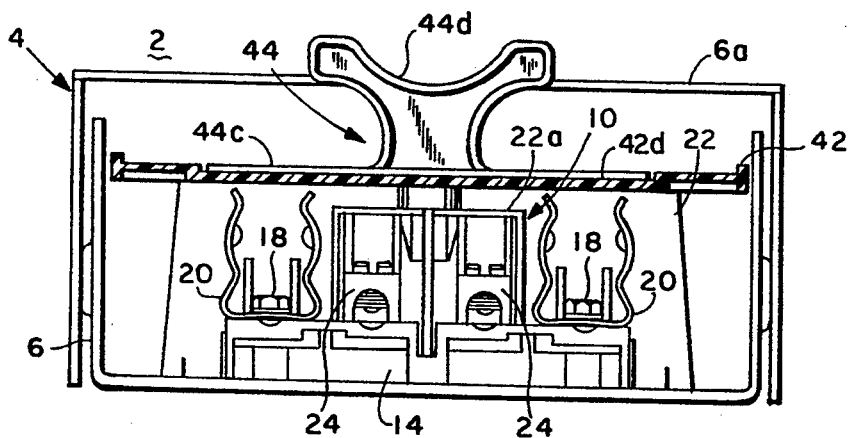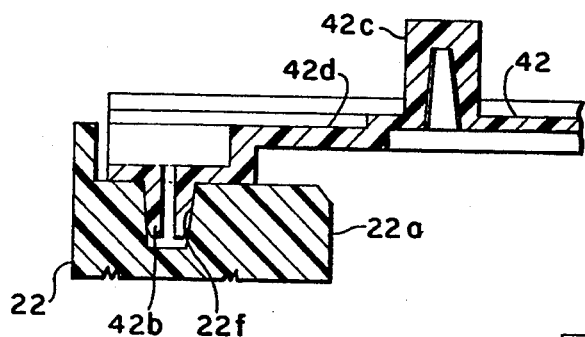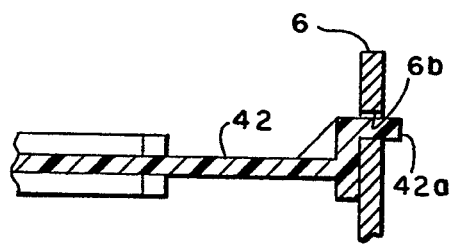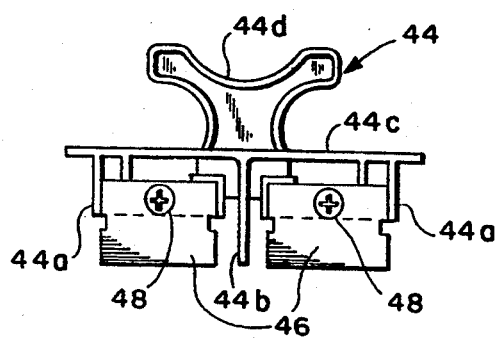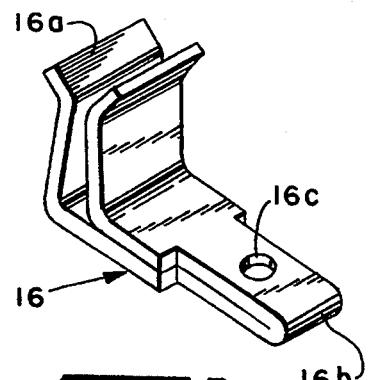

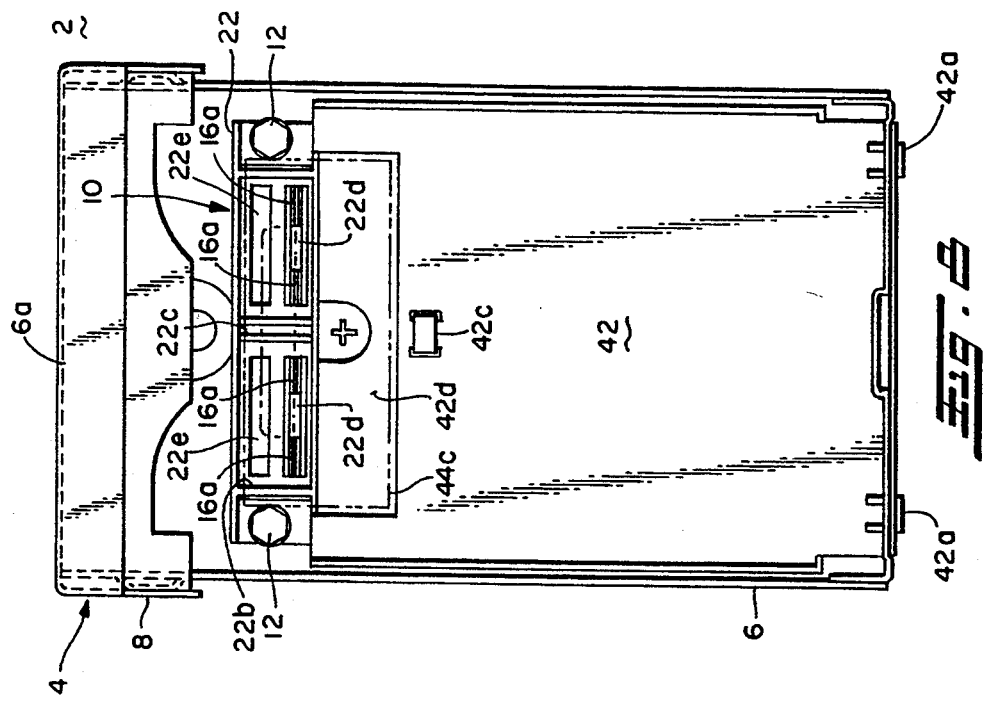
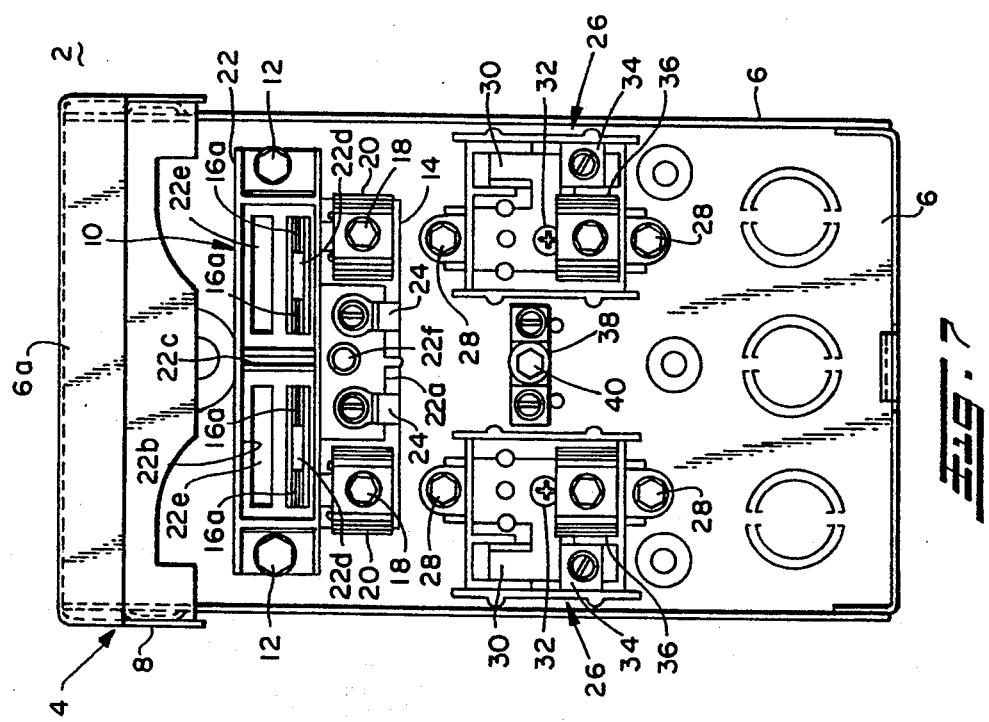

PULLOUT TYPE ELECTRIC DISCONNECT SWITCH

BACKGROUND OF THE INVENTION

This invention relates to electrical switching apparatus which is operated between ON and OFF conditions by inserting or removing a pullout member to or from stationary contact structure of a switch base. The pullout member has conductive blades which engage the stationary contacts to respectively bridge aligned pairs of such stationary contacts, thereby completing a circuit from an electrical source to a load. Switches of this type may incorporate fuses to provide overcurrent protection to apparatus connected to the disconnect switch.

Disconnect switches of the aforedescribed pullout type are well known. It is also well known to provide an inner cover or shield over the electrically live parts so that when the enclosure cover is opened, only the handle of the pullout member is accessible, and electrically live parts are covered by the shield. The shield has been a fiberboard insulator, a formed metal cover, or, as shown in U.S. Pat. No. 4,851,963 issued Jul. 25, 1989 to G. A. Miller et al and reissued Oct. 27, 1992 as Re. 34,113, the inner cover is a molded insulating shield. The upper end of this molded insulating shield engages formations on the switch base assembly, permitting the lower end of the shield to be pivoted downward into position within the metal case and secured in that position by a threaded fastener extending through a hole in the insulating shield and threading into an opening in a right-angle metal tab of the enclosure. In each of these switches the shield may be either completely removed or displaced to a position permitting access to the live parts of the switch while the switch pullout remains inserted in the switch ON position.

SUMMARY OF THE INVENTION

This invention provides a flange on the handle pullout of a pullout type disconnect switch, the flange overlying an inner cover or shield in close proximity thereto to prevent removal or displacement of the shield from an operative position without first removing the handle pullout. A substantial area of the flange overlaps the shield in the ON position of the switch, thereby preventing displacement of the shield. The shield is secured within the switch enclosure by a pair of tabs along its lower edge which are loosely inserted into corresponding rectangular slots in the bottom wall of the enclosure case. The upper end of the shield is then pivoted into the case and attached to the switch base assembly by press-in fastener means carried by the shield engaging within a hole in the switch base assembly. The press-in fastener means and cooperating hole are located behind the flange of the handle pullout. The tabs on the lower end of the inner shield are pivotally engaged within the rectangular openings in the bottom wall of the case of the enclosure, and cannot be disengaged while the press-in fastener means is engaged within the hole in the switch base assembly. Therefore, with the handle pullout in the switch ON position, the flange overlies the shield to prevent removal or displacement of the shield. A handle is provided on the shield to assist in disconnecting the press-in fastener means after the handle pullout has been removed in order to gain authorized access to the electrical connections within the enclosure. The line connections are shrouded by structure of the insulator of the switch base assembly to significantly reduce the possibility of accidental contact with the line terminations. Removal of the handle pullout disconnects power from other termination means, e.g. lug terminals or conductive fuse clips of the disconnect switch. The flange on the pullout member also prevents a workman, who is working on the switch with the shield removed and the pullout reinserted to the ON position, from placing his thumb against electrically live termination means in order to lever the pullout from the switch base assembly.

BRIEF DESCRIPTION OF THE DRAWINGS

FIG. 1 is a perspective view of a pullout type disconnect switch with an inner cover or shield in place and a handle pullout removed, the handle pullout having a wide area flange overlying the shield in the ON position of the switch in accordance with this invention;

FIG. 2 is a cross sectional view of the pullout type disconnect switch of FIG. 1 taken generally along the line 2—2 in FIG. 1;

FIG. 3 is a partial cross sectional view taken along line 3—3 in FIG. 1 showing the shield and integral fastener thereof attached within a hole in the base assembly of the switch;

FIG. 4 is a partial cross sectional view taken along line 4—4 in FIG. 1 showing a tab on the insulating shield positioned through an opening in the sheet metal case of the enclosure;

FIG. 5 is a side view of the pullout member of this invention showing conductive blades attached thereto;

FIG. 6 is a perspective view of a stationary contact of the switch;

FIG. 7 is a front plan view of the pullout type disconnect switch of this invention with the enclosure cover open and the pullout and shield removed to show the switch base assembly and fuse clip bases for the switch; and FIG. 8 is a front plan view of the pullout type disconnect switch similar to FIG. 7, but showing the shield in place and a dot-dash line showing of the pullout member inserted in the switch ON position.

DETAILED DESCRIPTION OF THE PREFERRED EMBODIMENT

The pullout type disconnect switch 2 of this invention is shown in FIG. 1. The switch comprises a sheet metal enclosure 4 comprising a box-shaped case 6 having an overlapping rain hood 6a at the top which overlaps the front and sides of the case. For purposes of this description, switch 2 is considered to be lying on its back surface in FIG. 1 with the front of the switch facing upward, the bottom located to the right and the top located to the left. A sheet metal cover 8 is hingedly connected to case 6 at the upper end of the case by a well known sliding hinge joint which permits cover 6 to be opened and then slid to a position for retaining it in the open position as shown in FIG. 1.

A switch base assembly 10 is attached to the back wall of case 6 by a pair of screws 12. The switch base assembly 10 comprises a molded insulating base member 14 having a plurality of recessed pockets (not shown) in a front surface into which two pairs of spaced stationary contacts 16 are assembled. One of the stationary contacts 16 is shown separately in FIG. 6. It comprises a conductive clip 16a and a tang 16b oriented 90° to the clip 16a, made from a folded conductive strip. A hole 16c is provided in the tang to receive a thread cutting screw 18 when a fuse clip termination 20 is attached thereto. A molded insulating handle guide member 22 is snap-fit attached to the base 14 over the stationary contacts 16 to hold the stationary contacts in place within the recessed pockets. Each of the stationary contacts 16 has electrical termination means connected thereto. The termination means may be wire lug connectors 24 as shown in FIG. 2 on the inner two stationary contacts to provide line connections to the switch. Similar termination means may be used on the outer two stationary contacts for a non-fused disconnect switch, but the disconnect switch shown in the drawings is a fused type and has fuse clips 20 mounted to the outer two stationary contact elements.

The fused-type disconnect switch shown in the drawings also has fuse base assemblies 26 (FIG. 7) attached to the back wall of case 6 by screws 28. The fuse bases are molded insulating members that have a conductive plate 30 attached to the front face thereof by a screw 32. A wire lug connector 34 is positioned on the conductive plate 30 at one side and a fuse clip 36 is attached to the conductive plate 30 at another side. Fuse clip 36 aligns with fuse clip 20 on the switch base assembly 10 for cooperatively receiving a fuse (not shown) therein. A neutral connector 38 is attached to the rear wall of case 6 between fuse bases 26 by a screw 40 (FIG. 7).

Handle guide 22 has a partitioned shroud 22a that is disposed over the line terminations 24 to provide an insulating barrier therebetween as well as around the front and sides thereof to prevent or minimize accidental contact with the line terminals. As mentioned above, a lower wall on the handle guide 22 overlies the stationary contacts 16 to hold them in place within the pockets of the switch base 14 and the handle guide and base are complementary formed for a snap-together fit. Screws 12 pass through holes in outer feet of the handle guide to mount the switch base assembly 10 to the back wall of switch case 6. The front of handle guide 22 is provided with a large rectangular pocket 22b having a center dividing barrier 22c and two openings 22d and 22e (FIGS. 7 and 8) in the rear wall of the pocket 22b on either side of the center barrier 22c. The respective openings 22d overlie the stationary contact clips 16a.

A molded insulating shield 42 or inner cover is positioned within the switch case 6 to cover the electrically live parts such as the fuses (not shown), fuse clips 20,36 and electrical terminations 24, 34. The shield 42 has a pair of tabs 42a at the lower end which are positioned within rectangaular slots 6b in the bottom end wall of the case 6. The slots 6b are made slightly oversize to permit the shield 42 to be inserted at an angle whereby the upper end is then pivoted into the case to rest upon the shroud portion 22a of handle guide 22. The handle guide shroud portion 22a has a bole 22f open to the front thereof and the molded insulating shield 42 has an integrally molded slotted pin 42b (FIG. 3) projecting from the back surface thereof to be inserted into the hole 22f. Pin 42b is slotted in an axial direction into four segments by a cross shaped slot when viewed from the front. The four segments of the pin 42b provide a resiliency to enable the pin 42b to be forced into the hole 22f and serve as a retention means for retaining the insulating shield 42 assembled within the switch case 6. The upper edge of the molded insulating shield 42 is disposed adjacent the lower edge of the molded insulating handle guide 22. The upper edge of the molded insulating shield at the extreme side edges thereof is stepped upwardly to overlie a portion of the handle guide. Molded insulating shield 42 is provided with an upstanding handle projection 42c for removal of the shield 42 by extracting the pin 42b from the hole 22f. The front surface of the molded insulating shield has a large recess 42d immediately adjacent the handle guide.

The handle pullout 44 is a molded insulating member having a pair of conductive blades 46 attached thereto by screws 48 (FIG. 5). The lower portion of handle pullout 44 is provided with side barriers 44a and a center barrier 44b extending fully between the conductive blades 46 and received within an opening of the center barrier 22c of the handle guide when the handle pullout 44 is inserted thereto. A large rectangular flange 44c is molded integrally with the handle pullout 44, the flange 44c being generally coplanar with the front of the switch 2. A handle 44d is integrally molded to pullout 44 and projects forward from flange 44c. When the handle pullout 44 is inserted into switch base assembly 10 in the ON position whereby the conductive blades 46 extend through openings 22d and bridge respective pairs of stationary contacts 16, the flange 44c overlies the recessed portion 42d of the molded insulating shield 42. The flange 44c generally sits within the recessed portion 42d creating a substantially flush upper surface with the remainder of the insulating shield 42. Flange 44c provides a safety interlock for the disconnect switch 2 preventing the insulating shield 42 from being removed while the handle pullout 44 is inserted and the switch is in the ON position. The wide area of engagement between flange 44c and shield 42 prevents the shield from being tilted to gain access to the electrically live parts therebehind. Once the handle pullout 44 is removed, the shield 42 can be removed by grasping the handle 42c and pulling the upper end upward and the pin 42b out of engagement with the hole 22f. The handle pullout 44 is capable of being reversed and inserted in a storage position through the upper slots 22e in the handle guide 22 wherein the flange 44c extends upwardly within the case 6 and does not interfere with the insulating shield 42. In the event it is necessary to service the disconnect switch 2 in the ON condition, and the shield 42 is therefore removed, the flange 44c on the re-inserted pullout 44 extends downwardly sufficiently to overlie the electrical terminations 20, 24, thereby inhibiting the workman from leveraging the pullout 44 out of the guide by placing his thumb against a live electrical member.

The foregoing has described a pullout type disconnect switch which, in a simple and inexpensive manner, provides added safety to users of the switch. Although the invention is described in the best mode contemplated for carrying it out, it is to be understood that it is susceptible of various modifications without departing from the scope of the appended claims.

We claim:

1. An electric disconnect switch comprising:
   an enclosure comprising a case open at a front side thereof and a cover attached to said case for closing off said open front side;
   an insulating switch base assembly mounted in said enclosure comprising an insulating switch base, aligned pairs of stationary contacts, termination means connected to each stationary contact for connection thereof to a respective electrical source or load, and a handle pullout guide;
   a substantially rigid insulating shield secured within said enclosure over said termination means, concealing said termination means from said open front side of said case, said shield being disposed adjacent said handle pullout guide; and a handle pullout removably inserted into said guide comprising a pair of conductor blades respectively bridging said aligned pairs of stationary contacts and a flange overlying said shield at a front side of said shield blocking removal and displacement of said shield and thereby blocking access to said termination means with said handle pullout inserted into said guide.

2. The electric disconnect switch defined in claim 1 wherein said shield is secured to said insulating switch base assembly by a fastener covered by said flange.

3. The electric disconnect switch defined in claim 2 wherein said fastener is an integral projection from said shield.

4. The electric disconnect switch defined in claim 1 wherein said shield is recessed adjacent said guide and said flange is disposed within said recess.

5. The electric disconnect switch defined in claim 4 wherein a front surface of said shield and a front surface of said flange are substantially coplanar when in respective operative positions.

6. An electric disconnect switch comprising:

an enclosure comprising a case open at a front side thereof and a cover attached to said case for closing off said open front side;

an insulating switch base assembly mounted in said enclosure comprising an insulating switch base, aligned pairs of stationary contacts, termination means connected to each stationary contact for connection thereof to a respective electrical source or load, and a handle pullout guide; and a handle pullout vertically removably inserted into said guide comprising a handle, a pair of conductor blades respectively bridging said aligned pairs of stationary contacts and a transverse flange interposed between said handle and said conductor blades covering said termination means with said handle pullout inserted into said guide, said flange blocking direct-line vertical access from said handle to said termination means.

7. The electric disconnect switch defined in claim 6 wherein said handle pullout guide comprises a shroud disposed around sides and top of respective ones of said termination means adapted for connection to said electrical source.

* * * * *